L. B. FISHER.
Seed-Planter.

No. 10,694. Patented Mar. 28, 1854.

UNITED STATES PATENT OFFICE.

LUTHER B. FISHER, OF COLDWATER, MICHIGAN.

IMPROVEMENT IN SEED-PLANTERS.

Specification forming part of Letters Patent No. 10,694, dated March 28, 1854.

*To all whom it may concern:*

Be it known that I, LUTHER B. FISHER, of Coldwater, in the county of Branch and State of Michigan, have invented a new and useful Improvement in Seed-Drills; and I do hereby declare that the following is a full, clear, and exact description of the construction and operation of the same, reference being had to the annexed drawings, forming part of this specification, in which—

Figure 1:
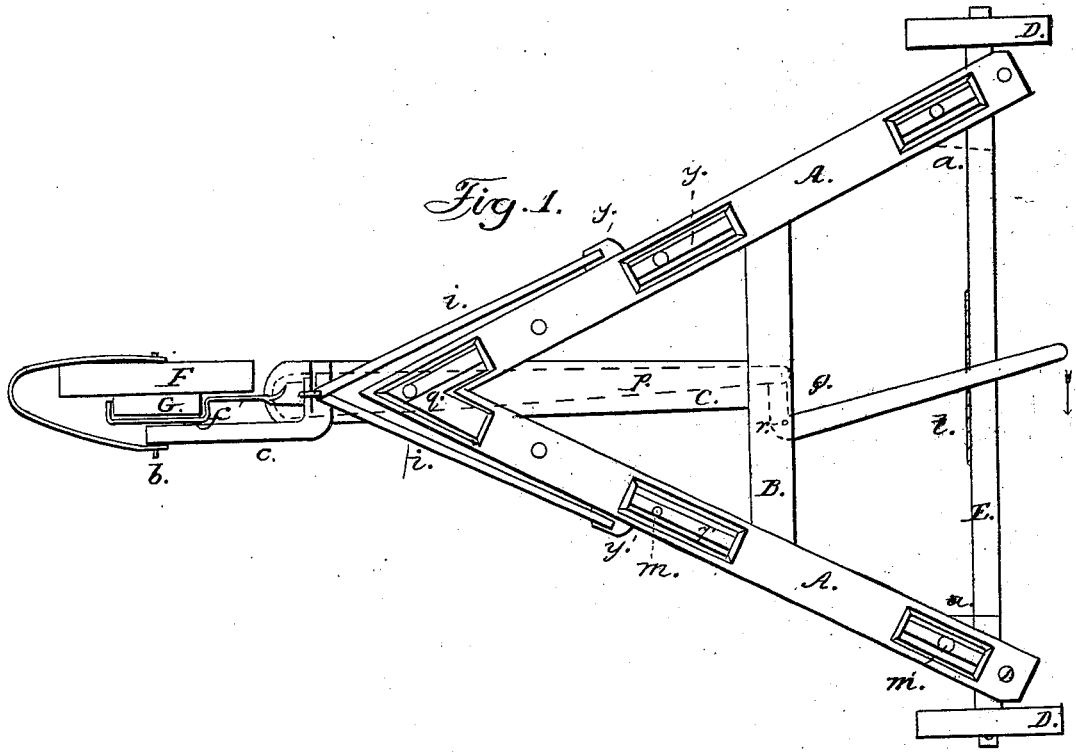
Figure 2:
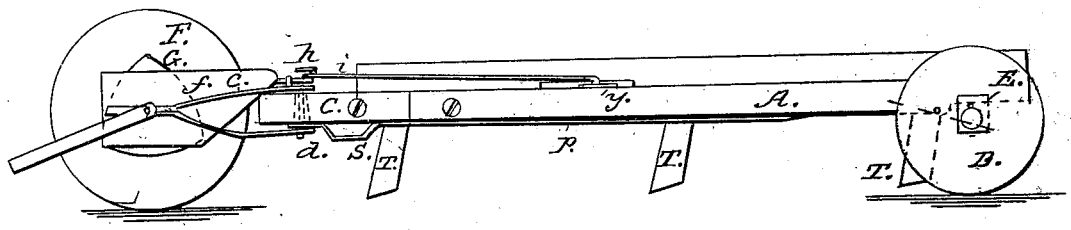

Figure 1 is a plan of the seed-drill, and Fig. 2 is a side elevation of the same.

Similar characters of reference in the several figures denote the same part of the apparatus.

My invention, which refers to drills of a triangular form of frame operated by a wheel at the head of the implement, consists in so attaching the regulating-wheel that by the operation of turning the drill the teeth are raised from the earth and the discharge of seed stopped. The particular arrangement will be understood by reference to the drawings, in which A represents the sides of the frame, held firmly together by the cross-piece B and beam C. The rear of the frame is supported by the wheels D, upon the axle E, loosely attached under the side A by the rods $a$. (Shown by red lines in Figs. 1 and 2.) In front of the frame is the wheel F, having on one side the cam G. This wheel turns on the axle $b$, and is attached to the frame by the clevis $c$, which passes above and below the beam C, and is held by the pin $d$, running through clevis and beam. Embracing the cam G is the slotted recessed plate $f$, its rear extremity terminating in a hook, $h$, to which is attached the rods $i$, connecting with the discharging-slides.

Fastened beneath the side pieces, A, are the drill-tubes T, communicating by openings $m$ with the hoppers or receptacles for the grain. These may be of any of the known forms, with any arrangement for regulating the delivery of the grain that may be found best suited to the end in view. Under the beam C runs the bar $p$, its front end fastened to the pin $d$, and the rear extremity attached to the short arm of the lever Q, which has its fulcrum at $r$ on the cross-piece B. This bar is slotted at $q$, to pass over the fore tooth, and has a short distance in rear of the pin $d$ a depression, $s$, the use of which will be hereinafter described. On the edge of the axle E are the notches $t$, to retain the lever Q in any desired position. The pin $d$ passes through a slot in the beam C, as shown in red lines, Fig. 2, so that the drawing of the bar $p$ to the rear inclines backward the pin and raises the front of the beam.

The operation of my improvement is as follows: The forward movement of the apparatus causes the reciprocating motion imparted to the plate $f$ by the cam G to be communicated to the slides $y\ y'$, for regulating, by any of the well-known methods, the distribution of the grain. When the extremity of the field is reached, the wheel F is drawn around at right angles to the beam C, the clevis $c$ and recessed plate $f$ turning about the pin $d$ and hook $h$, and the reciprocating motion of the plate producing no other effect than giving the point of attachment of the rods $i$ to the hook $h$ a slight lateral movement, the slides $y\ y'$ remaining entirely at rest longitudinally during the turning. As the clevis is drawn around perpendicular to the beam its lower branch slides under the depression $s$ of the bar $p$ and raises the front tooth from the ground. When the turning is completed, the reciprocating motion of the plate $f$ is transmitted to the slides $y\ y'$, the front of the implement falls to its usual level and the drilling proceeds as before. When it is desired to raise the fore part of the drill during its progress, the lever Q is moved, as indicated by the arrow, drawing the bar $p$ to the rear, and, by its connection with the pin $d$, inclining its lower extremity backward. This causes the frame to rise upon its rear wheels as a fulcrum, the front of the beam being elevated proportional to the movement of the lever Q.

The simple operation of this implement is due to the pivoted attachment of the driving-gear and the clevis attachment of the propelling-wheel, in connection with the rod $p$ and movable pin $d$. The manner of operating the slides may be varied to suit the operator, as well as the description of grain to be sown.

I do not claim the form of the frame or the method of operating the slides; but

What I do claim as my invention, and desire to secure by Letters Patent, is—

1. The combination of the rod $p$, lever Q, clevis $c$, and pin $d$, when the latter is movable in a longitudinal slot for raising the teeth from the ground, as herein fully set forth.

2. The attachment of the rods $i$, operating the slides, to the hook $h$, as described, so that the slides will remain at rest during the turning of the implement, as herein fully set forth.

In testimony whereof I have hereunto signed my name before two subscribing witnesses.

LUTHER B. FISHER.

Witnesses:
    GEO. PATTEN,
    SAML. GRUBB.